United States Patent
Behi et al.

(10) Patent No.: US 6,262,150 B1
(45) Date of Patent: Jul. 17, 2001

(54) AQUEOUS INJECTION MOLDING BINDER COMPOSITION AND MOLDING PROCESS

(75) Inventors: Mohammad Behi, Lake Hiawatha; Richard Duyckinck, Ringoes; Anthony Fanelli, Morris Plains, all of NJ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/597,136

(22) Filed: Jun. 20, 2000

(51) Int. Cl.$^7$ ........................................ C08J 89/00
(52) U.S. Cl. ........................ 524/27; 524/405; 524/413; 524/428; 524/430; 524/439; 524/442; 527/300; 106/162
(58) Field of Search .................. 524/27, 405, 413, 524/428, 430, 439, 442; 527/300; 106/162

(56) References Cited

U.S. PATENT DOCUMENTS

| | | | |
|---|---|---|---|
| 4,734,237 | 3/1988 | Fanelli et al. | 264/122 |
| 5,746,957 | 5/1998 | Fanelli et al. | 264/109 |
| 5,950,063 | * 9/1999 | Hens et al. | 419/5 |
| 6,146,560 | * 11/2000 | Behi et al. | 264/37.1 |
| 6,171,360 | * 1/2001 | Suzuki et al. | 75/255 |

* cited by examiner

Primary Examiner—Kriellion Sanders
(74) Attorney, Agent, or Firm—Roger H. Criss

(57) ABSTRACT

This invention provides a composition and a process for forming sintered, molded articles having improved dimensional stability. More particularly, this invention pertains to a composition having a sugar additive that increases the solids loading potential of the composition and a process for forming injection molded articles therefrom. Increasing the solids loading potential of the composition, enables the formation of metal or ceramic articles attaining about 98–99% of their theoretical maximum density, without cracking or shrinking significantly during sintering.

37 Claims, No Drawings

AQUEOUS INJECTION MOLDING BINDER COMPOSITION AND MOLDING PROCESS

BACKGROUND OF THE INVENTION

1. Field of Invention

This invention relates to a composition and a process for forming sintered, molded articles having improved dimensional stability.

2. Description of the Related Art

Injection molding is a well known process for forming thermoplastic molded articles, such as plastic bottles or containers. Other types of useful injection molded articles are formed from metal powder (metal injection molding, or "MIM") or ceramic powder (ceramic injection molding, or "CIM"), rather than a thermoplastic material. Powder injection molding generally involves injecting a moldable fluid composition, comprising a combination of a ceramic or metal powder, a gel forming binder and a solvent into a mold of a predetermined shape under conditions sufficient to form a shaped article, referred to as a "green body." After forming a ceramic or metal green body, it is often desirable to sinter the article to remove any residual solvent and density the article. However, sintering frequently causes undesirable cracks or distortions in the article.

In order to remedy this problem, it has been suggested to improve the mechanical strength of the fluid composition. This is accomplished through increasing its solid content. In particular, when using a powder containing composition, increasing the powder content will increase the mechanical strength of the composition and decrease the probability that a shaped article will crack during sintering. To the contrary, a composition having a lower powder content will cause cracking and shrinkage in molded articles formed therefrom during sintering.

To increase the amount of powder a composition can retain, it may be necessary to augment the applicable binder with at least one viscosity reducing additive. The binder generally comprises a water soluble component or a polysaccharide that combines with the powder to form a flowable gel. Optimally, the additive will serve to increase the powder holding capacity of the binder, decrease the porosity of a molded article, and result in sintered articles having superior mechanical and physical properties.

Compositions of the prior art have generally been unable to form green bodies having sufficiently high density and dimensional stability. Various attempts have been made using different additives to increase the solid holding capacity, and thus the mechanical strength, of a ceramic or metal composition. For example, U.S. Pat. No. 5,746,957 teaches a process for forming ceramic and/or metal articles comprising a ceramic and/or metal powder, a polysaccharide binder, a solvent and a gel strength enhancing agent comprising a borate compound. The borate compound is incorporated to increase the quantity of solid powder material that the composition can retain, thus increasing the density of the product. U.S. Pat. No. 5,950,063 teaches a powder injection molding process using a composition comprising a powder and a binder incorporating additives such as coupling agents, antioxidants and surfactants. Also, U.S. Pat. No. 4,734,237 provides a process for injection molding metallic or ceramic articles from a mixture comprising a metal or ceramic powder, a gel-forming material having specific desirable properties and a gel-forming material solvent. The specific gel-forming material allows for increased solid retention in the moldable composition.

SUMMARY OF THE INVENTION

The invention provides a composition for forming molded articles comprising:

a) at least one metal powder, at least one ceramic powder, or a combination thereof;
b) a gel forming polysaccharide binder; and
c) a sugar.

The invention further provides a process for forming molded articles comprising:

A) forming a fluid composition comprising:
   a) at least one metal powder, at least one ceramic powder, or a combination thereof;
   b) a gel forming polysaccharide binder;
   c) a sugar; and
   d) a solvent; and
B) molding the composition under conditions sufficient to form a solid molded article.

The invention also provides a process for forming molded articles comprising:

A) forming a fluid composition comprising:
   a) at least one metal powder, at least one ceramic powder, or a combination thereof;
   b) a gel forming polysaccharide binder;
   c) a sugar; and
   d) a solvent;
B) molding the composition under conditions sufficient to form a solid molded article; and
C) sintering the molded article.

The invention still further provides articles produced by the processes of the invention.

It would be desirable to provide a composition which enables a greater quantity of solid to be retained with in the composition. It has now been unexpectedly found that adding a sugar to a combination of at least one metal or ceramic powder, or combination thereof, and a polysaccharide binder reduces the viscosity of the composition and increases the solids loading. By increasing the solids loading, the sugar additive allows the formation a stable green body having increased shape retention, and a particle density sufficient to prevent cracking and deformation of the body during sintering. This also reduces the production cost of the injection molded components since less agar binder is used or replaced by less expensive glucose binder. Also, expensive supporting equipment is not needed and the components are not as sensitive to handling. When the green body is ultimately sintered, the sugar and solvent are burned away, leaving behind a high density, high strength ceramic or metal article. Sugar is generally inexpensive, commercially available as glucose that reduces the viscosity of the polysaccharide binder, and thus increases the amount of powder it can retain while in a fluid state. When the desired binder to sugar ratio is attained, the composition can be molded and sintered to produce an article having increased density compared to articles formed through prior art processes. The present invention also allows for the reduction of the amount of binder used in the composition, reducing the cost of forming the composition.

DETAILED DESCRIPTION OF THE PREFERRED EMBODIMENT

The present invention provides a process and composition for forming metal or ceramic molded articles from metal or ceramic powders. This composition comprising at least one metal powder or at least one ceramic powder, or a combination thereof, a gel forming polysaccharide binder and a sugar is combined with a solvent and molded into a self-supporting shaped article. The article is then preferably heated at a high temperature to sinter the particles together to form a highly dense and stable metal or ceramic article.

Adding sugar to the combination of the metal or ceramic powder and a polysaccharide binder reduces the viscosity of the composition and enables a greater quantity of solid to be retained in the composition. By increasing the solids loading, the sugar additive allows the formation of a stable body of densely packed particles having increased shape retention prior to sintering. When the green body is ultimately sintered, the sugar and solvent are burned away, leaving behind a high density, high strength metal or ceramic article.

To form the moldable composition, the metal or ceramic powder is mixed with the gel forming binder, a solvent and a sugar such that a homogeneous composition is formed. Metallic powders generally comprise elemental powders, semi-elemental powders, prealloyed powders or mixtures thereof. An elemental powder is generally composed of one metal element only. For example, an iron or nickel powder or a mixture thereof. A semi-elemental powder is generally a powder composed of more than one metal element, such as a semi-elemental ferrochrome powder comprised of 50% iron and 50% chrome. A mixture of elemental and semi-elemental powders is referred to as an elemental/semi-elemental powder, such as mixing a ferrochrome powder with an iron powder to form stainless steel. A prealloyed powder is a powder composition that has been formed from an existing metal alloy. For example, solid high or low carbon steel or super alloys having the desired composition can be melted and pulverized to form a powder. Combining different types of metallic powders reduces the necessary sintering temperature for an article. This is desirable because higher sintering temperatures can give rise to problems such as the evaporation of lower temperature elements in an alloy.

The preferred metal powders include elemental metal powder compositions such as copper, aluminum, gold, silver, nickel, titanium, tungsten, tantalum, iron and metal alloy powders such as steels (especially stainless steels), intermetallic components, and mixtures thereof. Preferred ceramic powders non-exclusively include powders of electronics, engineering and structural ceramics such as oxides, borides, nitrides, and silicides, carbides of metals or nonmetals, and mixtures thereof. Examples of such compositions are Ca-modified lead titanate, Samarium-modified lead titanate, lead metaniobate (PN), modified lead titanates such as (Pb, Ca)$TiO_3$ or (Pb, Sm)$TiO_3$, PZT (lead zirconate titanate, $PbZr_{1-x}Ti_xO_3$).

Other compositions that are preferred for the practice of this invention are $K_xNa_{1-x}NbO_3$, where x is between 0 and 0.5, $Na_{1-x}Li_xNbO_3$, where x is 0.02 to 0.13, $Na_{0.75}Pb_{0.125}NbO_3$, $Pb_{0.95}Bi_{0.05}(Ti_{0.975}Zn_{0.025})O_3$, $Pb_{0.95}Bi_{0.033}(Ti_{0.95}Zn_{0.017}Nb_{0.033})O_3$, $Pb_{0.9625}La_{0.025}(Ti_{0.99}Mn_{0.01})O_3$, $Pb(Ti_{0.95}Zn_{0.017}Nb_{0.033})O_3$, $Pb(Ti_{0.606}Zr_{0.394})O_3$, $Pb(Ti_{0.526}Zr_{0.48})O_3$, $Pb_{0.985}Bi_{0.01}(Ti_{0.085}Zr_{0.915})O_3$, $Pb_{0.95}Mg_{0.05}(Ti_{0.54}Zr_{0.43}Cr_{0.03})O_{2.085}$, $Pb_{0.985}La_{0.01}(Ti_{0.085}\ Zr_{0.915})O_3$, $Pb_{0.988}(Ti_{0.42}Zr_{0.58})Nb_{0.024}O_3$, $Pb_{0.995}(Ti_{0.074}Zr_{0.916}Sb_{0.010})O_3$, and $Na_{0.5}Bi_{0.5}TiO_3$. Certain of the above compositions can be more compactly described by the formula $M_xM'_{1-x}NbO_3$, wherein M and M' are chosen from Na, Li, and K and x is less than one. Other ceramic compositions from this preferred list can be more compactly described by the formula $Pb_xM''_v(Ti_yM_zM'_u)O_3$, wherein M and M' are selected from Zn, Nb, Zr, Sb, and Mn, M" is selected from Bi, La, and Nb, both x+v and y+z+u are about 1, and v is no more than about 0.05.

Relaxor ferroelectric ceramics have the lead titanate type of structure ($PbTiO_3$) and disorder on either the Pb-type of sites (called A sites) or the Ti-type of sites (called B sites). Examples of such relaxor ferroelectrics having B site compositional disorder are $Pb(Mg_{1/3}Nb_{2/3})O_3$(called PMN), $Pb(Zn_{1/3}Nb_{2/3})O_3$ (called PZN), $Pb(Ni_{1/3}Nb_{2/3})O_3$(called PNN), $Pb(Sc_{1/2}Ta_{1/2})O_3$, $Pb(Sc_{1/2}Nb_{1/2})O_3$ (called PSN), $Pb(Fe_{1/2}Nb_{1/2})O_3$(called PFN), and $Pb(Fe_{1/2}Ta_{1/2})O_3$. These are of the form $A(BF_{1/3}BG_{2/3})O_3$ and $A(BF_{1/2}BG_{1/2})O_3$, where BF and BG represent the atom types on the B sites. Further examples of relaxor ferroelectrics with B-site disorder are solid solutions of the above compositions, such as $(1-x)Pb(Mg_{1/3}Nb_{2/3})O_3$-$xPbTiO_3$ and $(1-x)Pb(Zn_{1/3}Nb_{2/3})O_3$-$xPbTiO_3$. Another more complicated relaxor ferroelectric that is preferred for the present invention is $Pb_{1-x}^{2+}La_x^{3+}(Zr_yTi_z)_{1-x/4}O_3$, which is called PLZT.

The preferred metal or ceramic powders of the composition are selected based on a variety of desired properties and characteristics, such as their size and shape distribution or surface chemistry. If a selected powder having a particular particle size, shape or surface chemistry is not be compatible with the chosen binder, it may be coated with one or more other additives.

The characteristics of the powder chosen is important because the selection can influence and control the flowability, evaporation-condensation, lattice, grain boundary surface diffusion, moldability, shrinkage and sintering mechanisms of the moldable composition. The size distribution of the particles in a powder can also influence the solids loading and moldability of the composition. The shape of the particles is important for flow behavior and shape retention during thermal processing. Preferably the particles are substantially spherical. The powder preferably has an average particle size of from about 1 to about 200 μm and more preferably from about 4.5 to about 150 μm. Further, should a combination of ceramic and metal powders, or a selection of different varieties of ceramic or metal powders be used, then they are preferably blended to ensure that each powder is uniformly dispersed within the composition. This allows the additive and binder to perform their functions most effectively and ensures that a maximum solid loading is obtained.

The metal or ceramic powder is preferably present in the unsintered composition in an amount of from about 50 to about 92 by weight of the composition. More preferably, the powder is present in an amount of from about 75 to about 91 by weight of the composition.

The composition also includes a gel forming binder. The gel forming binder is used primarily to achieve good flowability, good green strength of the molded component, and a high solids loading potential. Suitable binders include water soluble polysaccharide binders. Particularly, the polysaccharide binder preferably comprises an agaroid. For the purposes of this invention, an agaroid refers to agar and any gums resembling agar, and derivatives thereof such as agarose.

An agaroid is employed because it exhibits rapid gelation within a narrow temperature range, a factor which can increase the rate of production of articles. Additionally, the use of such gel-forming binders reduces the amount of binder needed to form a self-supporting article. Therefore, articles produced using gel forming binders comprising agaroids can significantly enhance the quality of and stability of green bodies and sintered articles.

The preferred agaroids are those which are water soluble and comprise agar, agarose, carrageenan, and the like and combinations thereof, and most preferably comprise agar, agarose, and mixtures thereof. The gel forming binder preferably is present in an amount ranging from about 1.5% to about 10% by weight of the composition. More preferably, the binder is present in an amount ranging from about 1.8% to about 5% by weight of the composition.

The unsintered composition then contains a sugar. Suitable sugars for this invention non-exclusively include glucose, sucrose, dextrose and fructose. In the most preferred embodiment, the sugar additive is glucose, in particular, a glucose or Dextrose of the general formula (D-Glucose-$CH_2OH(CHOH)_4CHO$). The sugar is generally commercially available. The sugar is preferably present in an amount of from about 0.5% to about 6% by weight of the composition. More preferably, the sugar is present in an amount of from about 1% to about 3.5% by weight of the composition. The preferred weight ratio of the binder to the sugar ranges from about 0.2 to about 3.5. More preferably, the weight ratio of the binder to the sugar ranges from about 0.1 to about 3.

Suitable solvents for the purposes of this invention include deionized water, and mixtures of water and alcohol. The solvent is added in an amount sufficient to dissolve the gel forming binder at the melting temperature of binder. The preferred solvent is water.

The compositions may include a gel strengthening agent, such as a borate, e.g., calcium borate, potassium borate, magnesium borate, zinc borate and mixtures thereof.

Each of the metal and ceramic powders described above may have different surface chemistries that may influence the manner in which a composition is prepared. Accordingly, certain powders may need to be coated with a suitable additive prior to combination with other powders having different surface chemistries. Suitable optional additives include coupling agents, antioxidants, lubricants, dispersants, elasticizing agents, plasticizers and compatibilizers.

The composition may also optionally contain a wetting agent or surfactant such as polyethylene glycol alkylether, or a lubricant such as zinc stearate, aluminum stearate or magnesium stearate.

The additives are used, in part, to ensure that the binder effectively coats or attaches to the powder particles. Some powder may react or be incompatible with the binder and, therefore, need to be coated with an additive prior to introduction of the binder. Powders may be pretreated with different additives to allow the appropriate additives to perform its function most effectively. These additives are applied by known methods including solvent slurry techniques, wet/dry milling, fluidization techniques, spray drying, dry dispersion or other techniques. The additives designed to interact directly with the powder surface, such as the antioxidants, surfactants, dispersants or coupling agents, are used for the initial coating of the powder. Application sequence of surface-active agents is dependent on powder chemistry and varies according to known chemical properties.

The composition components may be blended in a heated mixer by generally well known techniques. Suitable mixing equipment includes a tumbler with an agglomerate breaker, a ribbon mixer, a vertical screw mixer, a single or twin rotor mixer, and a turbine mixer. Also appropriate for this invention is a screw extruder. Screw extruders are frequently used for fluid processing and comprise a continuous rotating screw or screws in a closely fitting barrel. In practice, materials are fed into the extruder as a dry solids, then are heated and mixed within the barrel to form the fluid composition, and discharged at open end.

Once the composition is mixed, it is preferably shaped into a solid molded article. Various molding processes are well known in the art, including injection molding, hot-rolling, hot-pressing, flat pressing, blow molding, extruding and slip casting. For the fabrication of complex shapes such as cylinders, injection molding and extrusion are especially preferred. In order to help avoid the formation of a porous structure, vacuum may be applied during the forming step for shaped articles. If a hot-pressing method is used, the stress used for compacting is preferably as high as can be conveniently applied without fracturing the particles. For the purposes of this invention, molding is preferably conducted in an injection molding device. The composition is injected into a mold of a predetermined shape and size while in a fluid state with heat and under conditions sufficient to conform to the shape of the mold. The appropriate mold temperature can be achieved before, during or after the mixture is supplied to the mold. The preferred temperature for melt processing is at least about 5° C. above the melting point of the binder. More preferably, the temperature for melt processing is at least about 35° C. above the melting point of the binder. Molding is preferably conducted at a temperature ranging from about 75° C. to about 95° C. More preferably, the composition is molded at a temperature ranging from about 82° C. to about 95° C.

A wide range of molding pressures may be employed. Generally, the molding pressure is at least about 100 psi, preferably from about 100 psi (689.5 $KN/m^2$ )to about 50,000 psi ($3.4 \times 10^5$ $KN/m^2$ ) psi, although higher or lower pressures may be employed depending upon the molding technique used. More preferably molding pressures range from about 100 psi to about 2000 psi, and most preferably, are from about 150 psi to about 800 psi. Alternately, the composition may be extruded into pellet or particle form and stored for future molding.

After the article is molded, it is cooled to a temperature below the gel point of the gel-forming material. For the purposes of this invention, this temperature ranges from about 15° C. to about 40° C. More preferably, this temperature ranges from about 30° C. to about 40° C. Following this step, the green body is removed from the mold. The green body may be subsequently dried and placed into a furnace for sintering at high temperatures.

The sintering times and temperatures are regulated according to the powdered material employed to form the fluid composition. In general, the sintering temperatures are selected depending on the individual powders used. Sintering conditions for various materials are easily determinable by those skilled in the art. Ordinarily for wax-based systems, an absorbent, supporting powder is employed to assist in removing the wax from the part and to aid in supporting the part so that the intended shape of the product is maintained during sintering. The present invention eliminates that need for such materials.

For the purposes of this invention, the molded article is preferably sintered at a temperature ranging from about 1200° C. to about 1450° C. More preferably, the article is sintered at a temperature ranging from about 1300° C. to about 1400° C. The resulting product is a shaped article attaining about 98 to 99% of its theoretical maximum density.

The following non-limiting examples serve to illustrate the invention. Injection molding pressures quoted refer to machine hydraulic pressure. Solid wt % includes all residual material after removal of volatiles at 150° C. The result shown in each example is based on the average of ten samples unless otherwise stated.

EXAMPLE 1

A molding batch was prepared with stainless steel 17-4PH powder having a mean particle size of 22 $\mu$m. The batch was made with 7842 g of 17-4PH metal powder, 110 g of agar, 50 g of glucose, and 680 g deionized water [DI/H$_2$O]. Also, a mixture of methyl-p-hydroxybenzoate and propyl-p-hydroxybenzoate 1.6g and 1.2 g respectively added as biocides. A sigma mixer was used for compounding this batch. The agar, biocides, glucose and water were pre-mixed and transferred to the sigma mixer. During agitation the temperature was raised to 90–95° C. (194–203° F.) and mixed for 30 min. to melt the mixture. The metal powder was added incrementally. The total mixing time was 1.5 h at 90–95° C. (194–203° F.). After the material allowed to cool to 33° C. (91.4° F.), it was shredded into particulates using a food processor (Hobart shredder). Before molding and evaluating the flow characteristic for the shredded feedstock the moisture level was adjusted to 94.16 wt % by exposing the material to the atmosphere. Samples were taken periodically and analyzed by using Arizona moisture balance. Spiral testing was conducted by flowing the feedstock material through a hollow spiral mold to evaluate its flow properties, using a Boy 22M injection molding machine. The barrel temperature of the injection molding machine was set on 83° C. (180° F.) and mold temperature kept at 22–23 C. (71.6–73.4° F.) during the molding. At 94.16 wt. solid the average flow for ten samples at 500, 1000 and 1500 psi (3.5×10$^3$, 6.9×10$^3$, 10.3×10$^3$ KN/m$^2$) injection pressures was 5.56±0.63 (14.1±1.6 cm), 9.89±0.47 (25.1±1.2 cm), 12.47±1.34 (inch) (31.7±3.4 cm) respectively. This shows that by modifying the binder formulation (feedstock formulation), the viscosity of the feedstock material reduces and allow us to incorporated more metal powder in the feedstock formulation. By adding more metal (increasing the solid loading) the final shrinkage % will be reduced and better dimensional control can be achieved. Also, lesser water in the formulation provides lesser tendency for the moisture to separate from the feedstock and form water condensation.

EXAMPLE 2

The moisture content of the same feedstock material from Example 1 was adjusted to achieve 94.80 wt % solids. Spiral testing conducted on this material shows that the flow characteristic significantly decreased as the solid loading increased to 94.80 wt %. The material showed zero flow at 500 and 1000 psi(3.5×10$^3$, 6.9×10$^3$ KN/m$^2$) injection pressures. The average flow for ten samples at 1500 psi(10.3× 10$^3$ KN/m$^2$ injection pressure was only 2.66" ±0.3 (6.76±0.8). With this binder formulation (agar/glucose ratio) the feedstock solid loading has to be less than 94.80 wt. % to be used for molding.

EXAMPLE 3

A batch was prepared based on a 1:1 agar to glucose ratio, together with 7842 g of 17-4PH metal powder, 110 g agar, 110g glucose, 680 g DI/H$_2$O, 1.6 g methyl-p-hydroxybenzoate and 1.4 g propyl-p-hydroxybenzoate. The same mixing procedure was followed as described in Example 1. The solid wt % of the feedstock was adjusted to 95.04 wt % by evaporating the excess water from the material. Spiral testing was conducted on this material at 500, 1000, 1500, 2000 and 2300 psi (3.5×10$^3$, 6.9×10$^3$, 10.3×10$^3$, 13.8×10$^3$, 15.9×10$^3$ KN/m$^2$) injection pressures to evaluate and compare the effect of this batch formulation on flow characteristics. The average flow for ten samples at 95.04 wt % solid is shown in following table.

| Injection pressures | | | | |
|---|---|---|---|---|
| 500 (psi) | 1000 (psi) | 1500 (psi) | 2000 (psi) | 2300 (psi) |
| 0" | 2.7" ± 0.33 6.9 ± 0.8 cm | 3.51" ± 0.31 8.9 ± 0.8 cm | 3.64" ± 0.30 9.2 ± 0.8 cm | 5.23" ± 0.35 (inch) 13.3 ± 0.9 cm |

With this binder formulation (agar/glucose ratio) the feedstock does not flow at 500 psi with 95.04 wt % solid. The solid loading has to be less than 95.04 wt. % to be used for molding. The objective is to optimize the formulation at 95 wt % solid to achieve 3" to 4" flow at 500 psi pressure.

EXAMPLE 4

The moisture content of the feedstock from Example 3 was adjusted to provide material with 94.82 wt % solid by evaporating the excess water from the material. The following spiral testing data shows slight flow improvement at this solids level.

| Injection pressures | | | | |
|---|---|---|---|---|
| 500 (psi) | 1000 (psi) | 1500 (psi) | 2000 (psi) | 2300 (psi) |
| 1.85" ± 0.26 4.7 ± 0.7 cm | 3.04" ± 0.37 7.7 ± 0.9 cm | 4.74" ± 0.16 12.0 ± 0.4 cm | 6.7" ± 0.20 17.0 ± 0.5 cm | 7.18" ± 0.73 (inch) 18.2 ± 1.9 cm |

EXAMPLE 5

Example 1 was repeated except that the batch was formulated with a agar to glucose ratio of 0.82. An amount of 7842 g of 17-4PH stainless steel powder, 90 g agar, 110 g glucose, 680 g DI/H$_2$O, 1.6 g methyl-p-hydroxybenzoate and 1.4 g propyl-p-hydroxybenzoate were mixed in a sigma mixer. The same mixing procedures and conditions as Example 1 were used. The flow behavior of this batch was evaluated at 95.02 wt % solid. The following spiral testing shows the flow behavior of this composition.

| Injection pressures | | | |
|---|---|---|---|
| 500 (psi) | 1000 (psi) | 1500 (psi) | 2000 (psi) |
| 1.68" ± 0.08 4.3 ± 0.2 cm | 2.56" ± 0.10 6.5 ± 0.3 cm | 5.68" ± 0.24 14.4 ± 0.6 cm | 5.44" ± 0.4 13.8 ± 1.0 cm |

By changing the agar to glucose ratio from 1 (in Example 3) to 0.82 in this example the material at 95.02 wt % solids started to flow at 500 psi injection pressure. However, in Example 3, the flow at 95.04 wt % solids at 500 psi was zero. With this formulation material start flowing at 500 psi with high solid loading of 95.02 wt. % (also, see explanation in Example 1)

EXAMPLE 6

The flow characteristics of the feedstock from Example 5 were evaluated at 94.49 wt % solids. The spiral testing was conducted at 500, 1000 and 1500 psi injection pressures. The following results show, at slightly lower solid loading (94.49 wt %) the material flow was significantly improved. The comparative feedstock material (Example 13, below) does not flow at this solids loading.

| Injection pressures | | |
| --- | --- | --- |
| 500 (psi) | 1000 (psi) | 1500 (psi) |
| 5.05" ± 0.45 | 8.5" ± 1.45 | 9.22" ± 1.08 |
| 12.8 ± 1.1 cm | 21.6 ± 3.7 cm | 23.4 ± 2.7 cm |

EXAMPLE 7

This example illustrates a feedstock composition having 1:1 agar to glucose ratio, as in Example 3. However, the total amount of agar plus glucose in this example is 180 g vs. 220 g in Examples 3 and 4. This batch was compounded using 7842 g 17-4PH stainless steel powder, 90 g agar, 90 g glucose, 680 g DI/H$_2$O, 1.6 g methyl-p-hydroxybenzoate and 1.4 g propyl-p-hydroxybenzoate, using the same mixing steps and conditions as in Example 1. The excess moisture content of the feedstock was removed by evaporating the excess water from the material to reach a desired solids level of 94.50 wt %., and flow behavior was examined at this solids level. The following data shows the spiral results for this feedstock composition.

| | Injection pressures | | |
| --- | --- | --- | --- |
| 500 (psi) | 1000 (psi) | 1500 (psi) | 2000 (psi) |
| 0" | 3.5" ± 0.13 | 5.73" ± 0.51 | 7.63" ± 1.05 |
| 0 cm | 8.9 ± 0.3 cm | 14.6 ± 1.3 cm | 19.4 ± 2.7 cm |

The agar to glucose ratio for this batch was selected to be the same as the batch in example 4 but, the material flow at 500 psi became zero, even with lower solid loading of 94.50 vs. 94.80 wt % (for the composition of Example 4). However, this batch contains total of 2.3 wt % binder (agar+glucose) vs. 2.8 wt % binder in Example 4. This is indicates the agar to glucose ratio as well as total wt % of binder significantly effects the flowablity of the feedstock material.

EXAMPLE 8

A feedstock composition comprising 7842 g 17-4PH stainless steel powder, 90 g agar, 125 g glucose, 680 g DI/H$_2$O, 1.6 g methyl-p-hydroxybenzoate and 1.4 g propyl-p-hydroxybenzoate was used, with an agar to glucose ratio of 0.72, following the procedure of Example 1. The following table shows the flow behavior of the material at 94.99 wt % solids.

| Injection pressures | | |
| --- | --- | --- |
| 500 (psi) | 1000 (psi) | 1500 (psi) |
| 1.85" ± 0.14 | 3.32" ± 0.28 | 6.01" ± 0.28 |
| 4.7 ± 0.4 cm | 8.4 ± 0.7 cm | 15.3 ± 0.7 cm |

Comparing this result with that of Example 3 shows that increasing the amount of glucose and lowering the agar content has a significant effect on flow characteristics of the feedstock material. The agar to glucose ratio in Example 3 is 1 with total of 2.8 wt % binder (agar+glucose) content. In this example the ratio is 0.72 and total amount of binder content is 2.74 wt %.

EXAMPLE 9

A feedstock composition comprising 7842 g of stainless steel 17-4PH powder, 90 g agar, 180 g glucose, 680 g DI/H$_2$O, 1.6 g methyl-p-hydroxybenzoate and 1.4 g propyl-p-hydroxybenzoate was used, with an 1:2 agar to glucose ratio, following the procedure of Example 1. The spiral testing was conducted at 94.91 wt % solid at 500, 1000, and 1500 psi injection pressures.

| Injection pressures | | |
| --- | --- | --- |
| 500 (psi) | 1000 (psi) | 1500 (psi) |
| 4.55" ± 0.93 | 7.28" ± 0.92 | 8.62" ± 0.23 |
| 11.6 ± 2.4 | 18.5 ± 2.3 | 21.9 ± 0.6 cm |

The results of this example shows that a higher amount (3.44 wt %) of binder content with lower agar to binder ratio of 0.5 further improves the flow behavior of the feedstock material (compared with Example 8)

EXAMPLE 10

The flow characteristics of the feedstock material from Example 9 were evaluated at 94.56 wt % solids. The spiral testing conducted at three different injection molding pressure. The following table shows the results of the experiment.

| Injection pressures | |
| --- | --- |
| 500 (psi) | 1000 (psi) |
| 9.68" ± 0.55 | 16.60" ± 1.26 |
| 24.6 ± 1.4 cm | 42.2 ± 3.2 cm |

The feedstock exhibited excellent flow characteristics at 94.56 wt % solids. It should be mentioned that the comparative feedstock material (Example 13 below) could not be tested, molded or even fed into the injection molding machine at a 94.56 wt % solid.

EXAMPLE 11

A feedstock composition was designed based on the composition used in Example 9 with slightly higher agar/glucose ratio of 0.56. Similarly, the preparation of this batch was the same as Example 1. This batch was compounded using 7842 g 17-4PH stainless steel powder, 100 g agar, 180 g glucose, 680 g DI/H$_2$O (containing 0.27 wt % calcium tetra borate), 1.6 g methyl-p-hydroxybenzoate and 1.4 g propyl-p-hydroxybenzoate. The moisture content of the feedstock adjusted to 5.46% (94.54 wt % solid). Eleven flat test bar (⅛" thickness, ¼"–¾" variation in width, 6.5" length) samples were molded using a 55 ton Cincinnati injection molding machine. The average weight of ten as molded samples was 42.66±0.07 g. The results are shown in the table following Example 13.

EXAMPLE 12

The moisture content of feedstock material of Example 11 was adjusted to 5% (95 wt % solid). Ten flat test bar samples as in Example 11 were molded at 95.0 wt % solid, with the average weight of ten as molded samples being 43.8±0.09 g. The following data shows a comparison of as molded weight variation of the feedstock material of Comparative Example 13 (contains no glucose) molded at 92.60 wt % solid and material from Examples 11 and 12 molded at 94.54 and 95.0 wt % respectively. The results are shown in the following table.

EXAMPLE 13 (COMPARATIVE)

A molding composition was prepared without glucose as a comparison. The batch comprised 7842 g stainless steel 17-4PH powder, 165 g agar, 680 g DI/H$_2$O (containing 0.27 wt % calcium tetra borate), 1.6 g methyl-p-hydroxybenzoate and 1.4 g propyl-p-hydroxybenzoate. All the processing steps for preparation of this batch were the same as Example 1. The moisture level of the feedstock was adjusted to 7.40% (92.60 wt % solid). The average flow of ten samples at 500, 1000, and 1500 psi, was 3.57"±0.16, 8.14"±0.08 and 11.76"±0.14 respectively. The average as molded weight for six samples with this batch was 37.45±0.02 g.

| Sample # | As Molded weights (g) | | |
|---|---|---|---|
| | Comparative feedstock from Example 13 (92.60 wt % solid) | Samples from Example 11 (94.54 wt % solid) | Samples from Example 12 (95 wt % solid) |
| 1 | 37.45 | 40.33 | 41.06 |
| 2 | 37.42 | 40.39 | 41.10 |
| 3 | 37.45 | 40.46 | 41.00 |
| 4 | 37.43 | 40.28 | 41.15 |
| 5 | 37.46 | 40.40 | 41.12 |
| 6 | 37.46 | 40.35 | 41.10 |

As the solid loading increases the as molded weight of the samples increases. This provides higher green density which significantly reduces the final skrinkage. (Also see the plot of as molded weight vs. solid loading).

EXAMPLE 14

Four samples from Example 11, six samples from Example 12 along with eight samples from Example 13 were sintered under hydrogen atmosphere for 2 hours. The shrinkage for these samples evaluated and compared. The following table shows the results and the comparison.

| | Average % shrinkage Samples molded with comparative feedstock Example 13 | Average % shrinkage Samples molded with feedstock from Example 11 | Average % shrinkage Samples molded with feedstock from Example 12 |
|---|---|---|---|
| Width | 15.83 | 14.31 | 14.11 |
| Thickness | 17.93 | 14.87 | 14.67 |
| Length | 15.80 | 13.66 | 13.62 |

These data shows that the binder formulation of this invention improved the solid loading of the feedstock material from 92.5 wt % to 95.0 wt %. This provided greater dimensional control and improved the final (sintered) shrinkage by 10.9%, 18.2% and 13.8% for width, thickness and length of the parts respectively.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A composition for forming molded articles comprising:
   a) at least one metal powder, at least one ceramic powder, or a combination thereof;
   b) a gel forming polysaccharide binder; and
   c) a sugar.

2. The composition of claim 1 further comprising a solvent.

3. The composition of claim 1 wherein said at least one ceramic powder is selected from the group consisting of oxides, borides, nitrides, silicides, and carbides of metals and nonmetals, and mixtures thereof.

4. The composition of claim 1 wherein said at least one metal powder is selected from the group consisting of copper, aluminum, gold, titanium, tungsten, tantalum iron, silver, nickel, metal alloys, intermetallic compounds and mixtures thereof.

5. The composition of claim 1 wherein said metal powder comprises stainless steel.

6. The composition of claim 1 wherein the sugar is selected from the group consisting of glucose, sucrose, dextrose and fructose.

7. The composition of claim 1 wherein the sugar comprises glucose.

8. The composition of claim 1 wherein the binder comprises an agaroid.

9. The composition of claim 8 wherein said agaroid is agar.

10. The composition of claim 1 wherein said solvent comprises water.

11. The composition of claim 1 wherein said powder is present in an amount ranging from about 50% to about 92% by weight of the composition.

12. The composition of claim 1 wherein said gel forming binder is present in an amount ranging from about 1.5% to about 10% by weight of the composition.

13. The composition of claim 1 wherein said sugar is present in an amount ranging from about 0.5% to about 6% by weight of the composition.

14. The composition of claim 1 wherein the weight ratio of said binder to said sugar ranges from about 0.2 to about 3.5.

15. The composition of claim 1 further comprising a gel strengthening agent.

16. The composition of claim 1 further comprising a gel strengthening agent selected from the group consisting of calcium borate, potassium borate, magnesium borate, zinc borate and mixtures thereof.

17. A process for forming molded articles comprising:
   A) forming a fluid composition comprising:
      i) at least one ceramic powder, at least one metal powder, or a combination thereof;
      ii) a gel forming polysaccharide binder;
      iii) a sugar; and
      iv) a solvent;
   B) molding the composition under conditions sufficient to form a solid molded article; and
   C) sintering the molded article.

18. The process of claim 17 wherein said composition is molded at a temperature ranging from about 80° C. to about 95° C.

19. The process of claim 17 wherein said molding is conducted in an injection molding device.

20. The process of claim 17 wherein said molded article is sintered at a temperature ranging from about 1200 ° C. to about 1450° C.

21. The process of claim 17 wherein said at least one ceramic powder is selected from the group consisting of oxides, borides, nitrides, silicides, and carbides of metals and nonmetals, and mixtures thereof.

22. The process of claim 17 wherein the at least one metal powder is selected from the group consisting of copper, aluminum, gold, silver, nickel, metal alloys, intermetallic compounds and mixtures thereof.

23. The process of claim 17 wherein said powder comprises stainless steel.

24. The process of claim 17 wherein said sugar is selected from the group consisting of glucose, sucrose, dextrose and fructose.

25. The process of claim 17 wherein the sugar comprises glucose.

26. The process of claim 17 wherein said binder comprises an agaroid.

27. The process of claim 17 wherein said binder comprises agar.

28. The process of claim 17 wherein said solvent comprises water.

29. The process of claim 17 wherein said powder is present in the composition in an amount ranging from about 50% to about 92% by weight of the composition.

30. The process of claim 17 wherein said gel forming binder is present in an amount ranging from about 1.5% to about 10% by weight of the composition.

31. The process of claim 17 wherein said sugar is present in an amount ranging from about 0.5% to about 6% by weight of the composition.

32. The process of claim 17 wherein the weight ratio of said binder to said sugar ranges from about 0.2 to about 3.5.

33. The process of claim 17 wherein said composition further comprises a gel strengthening agent.

34. The process of claim 17 wherein said composition further comprises a gel strengthening agent selected from the group consisting of calcium borate, potassium borate, magnesium borate, zinc borate and mixtures thereof.

35. An article produced by the process of claim 17.

36. A process for forming molded articles comprising:
   A) forming a fluid composition comprising:
      i) at least one ceramic powder, at least one metal powder, or a combination thereof;
      ii) a gel forming polysaccharide binder;
      iii) a sugar; and
      iv) a solvent; and
   B) molding the composition under conditions sufficient to form a solid molded article.

37. An article produced by the process of claim 36.

* * * * *